(12) United States Patent
Yoshimitsu

(10) Patent No.: US 7,382,601 B2
(45) Date of Patent: Jun. 3, 2008

(54) ELECTRIC DOUBLE LAYER CAPACITOR AND METHOD OF MANUFACTURING SAME

(75) Inventor: Satoru Yoshimitsu, Saga (JP)

(73) Assignees: Saga Sanyo Industries Co., Ltd., Kishima-gun (JP); Sanyo Electric Co., Ltd., Moriguchi-shi (JP)

( * ) Notice: Subject to any disclaimer, the term of this patent is extended or adjusted under 35 U.S.C. 154(b) by 208 days.

(21) Appl. No.: 11/386,694

(22) Filed: Mar. 23, 2006

(65) Prior Publication Data

US 2006/0215351 A1    Sep. 28, 2006

(30) Foreign Application Priority Data

Mar. 28, 2005    (JP)    ............... 2005-090729

(51) Int. Cl.
*H01G 9/00*    (2006.01)
(52) U.S. Cl. ..................... 361/502; 29/25.03
(58) Field of Classification Search ............... 361/502; 29/25.03
See application file for complete search history.

(56) References Cited

U.S. PATENT DOCUMENTS 7,248,460 B2 *    7/2007    Omura et al. ............... 361/502

2007/0014076 A1 *    1/2007    Omura et al. ............... 361/502

FOREIGN PATENT DOCUMENTS

JP    10-097956    4/1998
JP    2000-124079    4/2000

* cited by examiner

*Primary Examiner*—Eric Thomas
(74) *Attorney, Agent, or Firm*—Westerman, Hattori, Daniels & Adrian, LLP.

(57) ABSTRACT

An electric double layer capacitor and a method of manufacturing are provided that are capable of improving high-rate performance and increasing capacity at lower costs. The electric double layer capacitor includes: an electrode unit having a pair of polarizable electrodes, each composed of a carbon material, and a separator interposed between the pair of polarizable electrodes; and an electrolyte solution impregnated in the pair of polarizable electrodes and the separator. The carbon material of at least one of the pair of polarizable electrodes contains fullerene activated by a microwave activation process and/or carbon nanotube activated by a microwave activation process.

17 Claims, 2 Drawing Sheets

ELECTRIC DOUBLE LAYER CAPACITOR AND METHOD OF MANUFACTURING SAME

BACKGROUND OF THE INVENTION

1. Field of the Invention

The present invention relates to an electric double layer capacitor that comprises an electrode unit having a pair of polarizable electrodes and a separator interposed between the pair of polarizable electrodes, the pair of polarizable electrodes each containing a carbon material, and in which the pair of polarizable electrodes is impregnated with an electrolyte solution. The invention also relates to a method of manufacturing the capacitor.

2. Description of Related Art

A well-known example of electric double layer capacitor is a coin-shaped electric double layer capacitor having the following configuration. The coin-shaped electric double layer capacitor comprises an element having a pair of polarizable electrodes, each composed mainly of a carbon material, and a porous separator interposed between the pair of polarizable electrodes. The element is accommodated in a case composed of a pair of current collector metal foils and an insulative resin for insulating the current collector metal foils.

Conventionally, the polarizable electrodes have been made of a porous carbon material, such as activated carbon and fibrous activated carbon. The electric double layer capacitor using the porous carbon material for the polarizable electrodes shows large internal resistance and is therefore unable to deliver a large current; in other words, it has a drawback of poor high-rate performance.

In addition, the porous carbon material needs to be fabricated through complicated manufacturing processes such as an alkali activation process and a steam activation process, necessitating higher manufacturing costs. Furthermore, the specific surface area of the porous carbon material almost reaches its limit at 3200 m2/g, and it is difficult to make the specific surface area higher than the limit.

In view of these problems, various proposals have been made. For example, Japanese Published Unexamined Patent Application No. H10-97956 proposes use of fullerene as a material for the polarizable electrodes. Japanese Published Unexamined Patent Application No. 2000-124079 proposes that the material for the polarizable electrodes contain a carbon nanotube. The fullerene and the carbon nanotube are obtained industrially through a physical growing process, such as arc discharge. Use of the fullerene and the carbon nanotube as a material for the polarizable electrodes achieves an improvement in the capacitor's high-rate performance compared to the use of the porous carbon materials, such as activated carbon and fibrous activated carbon.

A problem with the foregoing conventional techniques, however, has been that when the fullerene is subjected to an alkali activation process or a steam activation process for a long period of time or the carbon nanotube is subjected to an alkali activation process for a long period of time for the purpose of improving the capacity of the electric double layer capacitor further, molecular structures of the fullerene and the carbon nanotube are destroyed, and thus, further increase in the capacity has not been possible.

BRIEF SUMMARY OF THE INVENTION

Accordingly, it is an object of the present invention to provide an electric double layer capacitor that has improved high-rate performance and increased capacity at lower manufacturing costs, and to provide a method of manufacturing such a capacitor.

In order to accomplish the foregoing and other objects, the present invention provides an electric double layer capacitor comprising: an electrode unit having a pair of polarizable electrodes, each composed of a carbon material, and a separator interposed between the pair of polarizable electrodes; and an electrolyte solution impregnated in the pair of polarizable electrodes and the separator, the carbon material of at least one of the pair of polarizable electrodes containing fullerene activated by a microwave activation process.

As with the just-described configuration, when the carbon material of at least one of the pair of polarizable electrodes contains the fullerene activated by a microwave activation process, the high-rate performance of the electric double layer capacitor can be improved, and the capacity can be increased. This is believed due to the following reasons.

The activation processes as mentioned in the section "Background of the Invention" above, such as an alkali activation process and a steam activation process, only erode fullerene molecules from the exterior thereof, so fullerene molecules are destructed if the processes are carried out for a long period of time. In contrast, when the microwave activation process is used, the material is heated from the interior of the material uniformly and rapidly to cause activation; therefore, a uniform fullerene with a large specific surface area (with a specific surface area of about 3500 $m^2/g$) can be obtained without destructing the molecular structure.

Moreover, the activation process can be performed merely by irradiating the fullerene with microwaves to heat the fullerene, so the manufacturing cost of the electric double layer capacitor can be lowered.

It is desirable that the carbon material of at least one of the pair of polarizable electrodes consist only of fullerene activated by a microwave activation process.

The reason is that such a configuration makes it possible to further improve the high-rate performance of the electric double layer capacitor and further increase the capacity.

In addition, it is desirable that the fullerene have spherically shaped molecules, and that the fullerene be a mixture of fullerene having 60 carbon atoms per molecule and fullerene having 70 carbon atoms per molecule.

The fullerene that has spherically shaped molecules and is a mixture of fullerene having 60 carbon atoms per molecule and fullerene having 70 carbon atoms per molecule has a symmetrical structure and excellent in oxidation stability. Accordingly, the electric double layer capacitor employing the polarizable electrodes composed mainly of this fullerene is free from gas generation due to the oxidation of the electrodes themselves, and therefore has high reliability.

In order to accomplish the foregoing and other objects, the present invention also provides a method of manufacturing an electric double layer capacitor, comprising: activating fullerene by a microwave activation process; preparing an electrode containing a carbon material and a binder, the carbon material composed of the fullerene activated by the microwave activation process; providing a pair of polarizable electrodes using the electrode that has been prepared in the step of preparing the electrode as at least one of the pair of polarizable electrodes; disposing a separator between the pair of polarizable electrodes; and impregnating an electrolyte solution into the pair of polarizable electrodes and the separator.

With the just-described method, the electric double layer capacitor can be fabricated easily.

In order to accomplish the foregoing and other objects, the present invention also provides an electric double layer capacitor comprising: an electrode unit having a pair of polarizable electrodes, each made of a carbon material, and a separator interposed between the pair of polarizable electrodes; and an electrolyte solution impregnated in the pair of polarizable electrodes and the separator; the carbon material of at least one of the pair of polarizable electrodes containing a carbon nanotube activated by a microwave activation process.

When the carbon material of at least one of the pair of polarizable electrodes contains a carbon nanotube activated by a microwave activation process, as described above, the high-rate performance of the electric double layer capacitor improves and the capacity increases. This is believed due to the following reasons.

Subjecting carbon nanotube to a microwave activation process results in formation of micropores and macropores and increases the surface area. At the same time, the diameter of the graphene sheet further increases, and the graphene interlayer distance accordingly increases. Because of these reasons, the ion sieve effect does not easily occur. Furthermore, even with the single-layer structure carbon nanotube, the surface area of the grapheme sheet is increased.

Moreover, when the microwave activation process is used, the material is heated from the interior of the material uniformly and rapidly to cause activation. Therefore, the destruction of the molecular structure does not occur.

Moreover, the activation process can be carried out merely by irradiating the carbon nanotube with microwaves to heat the fullerene, so the manufacturing cost of the electric double layer capacitor can be lowered.

It is preferable that the carbon material of at least one of the pair of polarizable electrodes consist of carbon nanotube activated by a microwave activation process.

This configuration enables the electric double layer capacitor to have further improved high-rate performance and to achieve a further increased capacity.

In addition, it is desirable that the microwave-activated carbon nanotube have a graphene interlayer distance of 4.0 Å or greater, more desirably 5.3 Å or greater.

This restriction is made because the specific surface area and the capacity per unit electrode material weight increase significantly when the graphene interlayer distance is 4.0 Å or greater. In particular, when the graphene interlayer distance is 5.3 Å or greater, the specific surface area and the capacity per unit electrode material weight show drastic increases (for example, the specific surface area is about 3500 $m^2/g$ when the graphene interlayer distance is 5.3 Å or greater).

In order to accomplish the foregoing and other objects, the present invention also provides a method of manufacturing an electric double layer capacitor, comprising: activating a carbon nanotube by a microwave activation process; preparing an electrode containing a carbon material and a binder, the carbon material composed of the carbon nanotube activated by the microwave activation process; providing a pair of polarizable electrodes using the electrode that has been prepared in the step of preparing the electrode as at least one of the pair of polarizable electrodes; disposing a separator between the pair of polarizable electrodes; and impregnating an electrolyte solution into the pair of polarizable electrodes and the separator.

With the just-described method, the electric double layer capacitor can be fabricated easily.

In the step of activating the carbon nanotube by a microwave activation process, it is desirable that the carbon nanotube be microwave-activated at a temperature of 650° C. or higher, and more desirably 800°0 C or higher.

This restriction is made because the carbon nanotube activated by a microwave activation process will have a graphene interlayer distance of 4.0 Å or greater if the temperature of the microwave activation process is 650° C. or higher. If the temperature of the microwave activation process is 800° C. or higher, the carbon nanotube activated by the microwave activation process will have a graphene interlayer distance of 5.3 Å or greater.

In order to accomplish the foregoing and other objects, the present invention also provides an electric double layer capacitor comprising: an electrode unit having a pair of polarizable electrodes, each made of a carbon material, and a separator interposed between the pair of polarizable electrodes; and an electrolyte solution impregnated in the pair of polarizable electrodes and the separator, the carbon material of at least one of the pair of polarizable electrodes containing fullerene activated by a microwave activation process and a carbon nanotube activated by a microwave activation process.

In order to accomplish the foregoing and other objects, the present invention also provides a method of manufacturing an electric double layer capacitor, comprising: activating fullerene by a microwave activation process and activating a carbon nanotube by a microwave activation process; preparing an electrode containing a carbon material and a binder, the carbon material composed of the fullerene activated by the microwave activation process and the carbon nanotube activated by the microwave activation process; and providing a pair of polarizable electrodes using the electrode that has been prepared in the step of preparing the electrode as at least one of the pair of polarizable electrodes; disposing a separator between the pair of polarizable electrodes; and impregnating an electrolyte solution into the pair of polarizable electrodes and the separator.

An example of the electrolyte solution to be impregnated in the polarizable electrodes and the separator is a solution in which an electrolyte is dissolved in an organic solvent. Examples of the organic solvent include carbonates, alcohols, nitrites, amides, and ethers, either alone or in the form of a mixture thereof. Examples of the electrolyte include combinations of cations that include proton, alkali metal ions, quaternary ammonium ions, and quaternary phosphonium ions, either alone or in combination, and anions that include sulfonate ions, perchlorate ions, arsenic hexafluoride ions, halide ions, phosphate ions, sulfate ions, and nitrate ions, either alone or in combination.

The separator may be made of any porous insulative material as long as it prevents the pair of polarizable electrodes from electrical short-circuiting, is electrochemically stable, shows a large ion-permeability, and has a certain degree of mechanical strength. Specific examples of the material for the separator include nonwoven fabric, porous polypropylene film, polyethylene film, and cellulose (paper).

The present invention achieves an improvement in the high-rate performance and an increase in the capacity of the electric double layer capacitor at lower manufacturing costs.

DETAILED DESCRIPTION OF PREFERRED EMBODIMENTS OF THE INVENTION

Hereinbelow, the present invention is described in further detail based on preferred embodiments thereof. It should be construed, however, that the present invention is not limited to the following preferred embodiments and various changes and modifications are possible without departing from the scope of the invention.

First Preferred Embodiment

Figure 1:
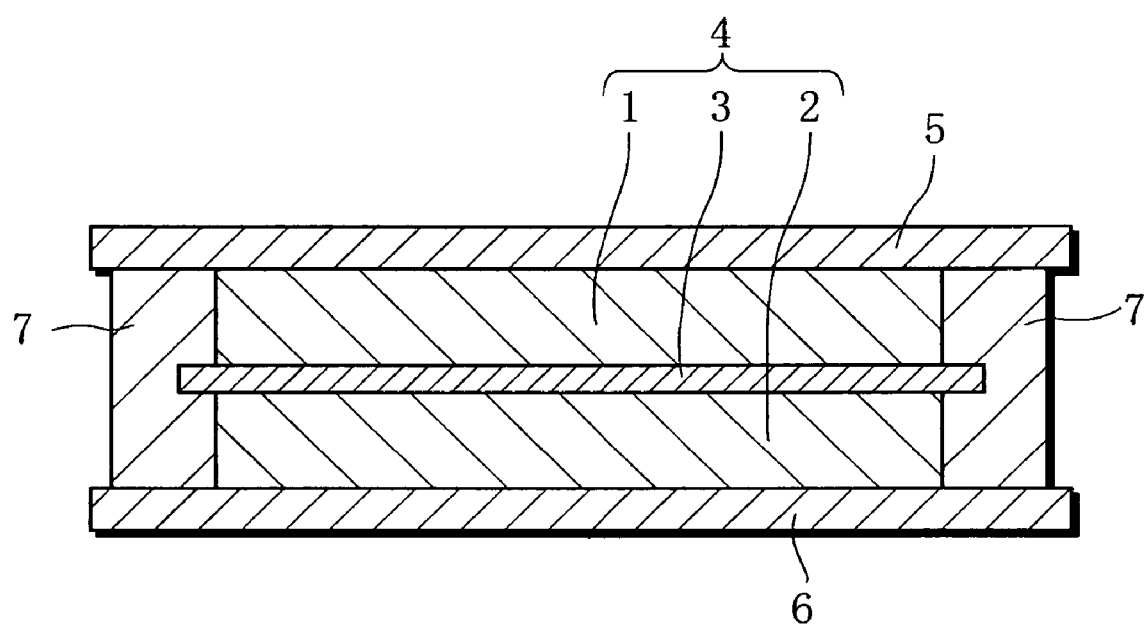
FIG. 1 illustrates a cross-sectional view of an electric double layer capacitor according to the present invention.

An electric double layer capacitor according to one embodiment of the present invention has an electrode unit 4, as illustrated in FIG. 1. In the electrode unit 4, a first polarizable electrode (positive electrode) 1 and a second polarizable electrode (negative electrode) 2, both of which contain fullerene that has been activated by microwave heating, are opposed to each other with a separator 3 made of cellulose-based nonwoven fabric interposed therebetween. The electrode unit 4 is accommodated in a space formed by two current collectors 5 and 6, both made of etched aluminum foil, and insulative resin 7. An electrolyte solution is impregnated in the electrode unit 4. The first polarizable electrode 1 and the second polarizable electrode 2 are electrically connected to the current collector 5 and the current collector 6, respectively.

The thickness of the electric double layer capacitor was 3.2 mm and the diameter thereof was 15.0 mm.

The above-described electric double layer capacitor was fabricated in the following manner.

Preparation of Polarizable Electrodes

First, fullerene C60, having 60 carbon atoms per molecule and spherically shaped molecules, and fullerene C70, having 70 carbon atoms per molecule and spherically shaped molecules, were mixed at a weight ratio of 3:1. The mixture was activated by irradiating the mixture with microwaves under the following conditions. The specific surface area of the fullerene (active material) that was subjected to the microwave activation process was found to be 3500 $m^2/g$ (measured by BET method).

Conditions of Microwave Application
Temperature: 800° C.
Duration: 30 minutes

Next, the above-described fullerene activated by the microwave activation, process was mixed with carbon black as a conductive agent and polytetrafluoroethylene as a binder at a weight ratio of 8:1:1. The mixture was molded into a disk shape and thereafter vacuum-dried at 150° C. for 2 hours. Thus, the first polarizable electrode 1 and the second polarizable electrode 2 were prepared.

Preparation of Electrolyte Solution

Tetraethylammonium tetrafluoroborate, serving as a supporting salt, was dissolved into an organic solvent composed of propylene carbonate at a concentration of 1.0 mole/liter to prepare an electrolyte solution.

Assembling Coin-shaped Electric Double Layer Capacitor

The first polarizable electrode 1 and the second polarizable electrode 2 were opposed to each other with interposing the separator 3 made of cellulose-based nonwoven fabric therebetween to prepare the electrode unit 4. The electrolyte solution was impregnated into the electrode unit 4, and thereafter the electrode unit 4 was accommodated into a space formed by the insulative resin 7 and the two current collectors 5 and 6 made of etched aluminum foil, to thus prepare the coin-shaped electric double layer capacitor.

Second Preferred Embodiment

A coin-shaped electric double layer capacitor was fabricated in the same manner as in the first preferred embodiment except that the active material was prepared in the following manner.

First, an aggregate of carbon nanotube was prepared by a laser application process in which CO2 laser was applied to a graphite target under the conditions set out below. Thereafter, in order to remove the hemispherically shaped portions at end portions of each carbon nanotube to form openings, the carbon nanotubes were treated with a nitric acid solution. Thus, open-end tube-shaped carbon nanotubes were prepared. It should be noted that a carbon nanotube has a structure in which a graphene sheet (in which carbon atoms are arrayed at vertexes of hexagons) is rolled up in a tubular shape. A multilayer structure carbon nanotube is composed of two or more graphene sheets, while a single-layer structure carbon nanotube is composed of a single graphene sheet.

Conditions of $CO_2$ Laser Application
Temperature: room temperature
Pressure: 760 Torr
Atmosphere: inert argon gas atmosphere Next, the open-end tube-shaped carbon nanotubes were irradiated with microwaves under the conditions set out below to activate the carbon nanotubes. The specific surface area of the carbon nanotube (active material) activated by the microwave activation process was found to be 3500 $m^2/g$.

Conditions of Microwave Application
Temperature: 800° C.
Duration: 30 minutes

EXAMPLES

Example A

An electric double layer capacitor fabricated according to the first preferred embodiment was employed as Example A.

The electric double layer capacitor thus fabricated is hereinafter referred to as a capacitor A of the invention.

Comparative Example X1

Activated carbon and potassium hydroxide were mixed at a weight ratio of 4:1 and stirred at 500° C. for 60 minutes to activate the material. An electric double layer capacitor was fabricated in the same manner as in Example A except that the alkali-activated carbon that was activated by the just-described alkali activation process was used as the carbon material (active material) of the pair of polarizable electrodes.

The electric double layer capacitor thus fabricated is hereinafter referred to as a comparative capacitor X1.

Comparative Example X2

An electric double layer capacitor was fabricated in the same manner as in Example A above except that fullerene that was not subjected to an activation process (unprocessed fullerene) was used as the carbon material of the polarizable electrodes.

The electric double layer capacitor thus fabricated is hereinafter referred to as a comparative capacitor X2.

Comparative Example X3

Fullerene and potassium hydroxide were mixed at a weight ratio of 4:1, and stirred at 500° C. for 60 minutes to activate the material. An electric double layer capacitor was fabricated in the same manner as in Example A above except that the alkali-activated fullerene prepared in the just-described manner was used as the carbon material of the polarizable electrodes.

The electric double layer capacitor thus fabricated is hereinafter referred to as a comparative capacitor X3.

Experiment A-1

Samples of the capacitor A of the invention and the comparative capacitors X1 to X3 were subjected to constant-current charging and discharging at a current density of 100 mA per electrode material weight to find their DC capacitances and internal resistances from the discharge curves and thereby calculate their capacities per unit electrode material weight (Cap.). Their specific surface areas were also measured. The results are shown in Table 1. It should be noted that the number of samples was 20 for each capacitor, and Table 1 shows the mean values.

TABLE 1

| Electric double layer capacitor | Carbon material | Activation method | Specific surface area (m²/g) | Cap. (F/g) |
|---|---|---|---|---|
| Capacitor A | Fullerene | Microwave activation | 3500 | 60.5 |
| Comparative capacitor X1 | Activated carbon | Alkali activation | 3200 | 41.1 |
| Comparative capacitor X2 | Fullerene | Not activated | 1600 | 46.1 |
| Comparative capacitor X3 | Fullerene | Alkali activation | 2200 | 44.2 |

Table 1 clearly demonstrates that, while the comparative capacitors X1 to X3 showed capacities per unit electrode material weight of 41.1 F/g to 46.1 F/g, the capacitor A of the invention showed 60.5 F/g; thus, the capacitor A of the invention proved to have a larger capacity than the comparative capacitors X1 to X3. This is believed due to the fact that the capacitor A of the invention had a specific surface area of 3500 m²/g, which was larger than those of the comparative capacitors X1 to X3, which had specific surface areas of 1600 m²/g to 3200 m²/g.

Experiment A-2

The amounts of remaining potassium were measured in the fullerene activated by a microwave activation process, used for the capacitor A of the invention, the unprocessed fullerene, used for the comparative capacitor X2, and the fullerene activated by the alkali activation process, used for the comparative capacitor X3. The results are shown in Table 2. The measurement was conducted by inductively-coupled plasma spectrometry (IPC).

TABLE 2

| Electric double layer capacitor | Carbon material | Activation method | Amount of remaining potassium (ppm) |
|---|---|---|---|
| Capacitor A | Fullerene | Microwave activation | 200 |
| Comparative Capacitor X2 | Fullerene | Not activated | 250 |
| Comparative Capacitor X3 | Fullerene | Alkali activation | 680 |

Table 2 clearly demonstrates that while the amounts of remaining potassium in the comparative capacitors X2 and X3 were 250 ppm and 680 ppm, respectively, the capacitor A of the invention showed an amount of remaining potassium of 200 ppm, and that the capacitor A of the invention proved to have a less amount of remaining potassium than the comparative capacitors X2 and X3.

Example B1

An electric double layer capacitor fabricated according to the second preferred embodiment was employed as Example B1.

The electric double layer capacitor thus fabricated is hereinafter referred to as a capacitor B1 of the invention.

Example B2 to B4

Three types of electric double layer capacitors were fabricated in the same manner as in Example B1 above except that the temperatures at which the microwave activation process was performed were 500° C., 650° C., and 950° C., respectively.

The electric double layer capacitors thus fabricated are hereinafter referred to as capacitors B2 to B4 of the invention, respectively.

Comparative Example X1

The same comparative capacitor X1 as described in the foregoing was employed as Comparative Example X1.

Comparative Example Y

An electric double layer capacitor was fabricated in the same manner as in Example B1 above except that carbon nanotube that was not subjected to an activation process (unprocessed carbon nanotube) was used as the carbon material (active material) of the polarizable electrodes.

The electric double layer capacitor thus fabricated is hereinafter referred to as a comparative capacitor Y.

Experiment B-1

Samples of the capacitors B1 to B4 of the invention and the comparative capacitors X1 and Y were subjected to constant-current charging and discharging at current densities per electrode material weight of 100 mA, 500 mA, and 1000 mA, to find DC capacitances and internal resistances from the discharge curves and thereby calculate their capacities per unit electrode material weight (Cap.). In addition, the graphene interlayer distances (the distance between graphene sheets in a multilayer structure carbon nanotube, which has a plurality of graphene sheets) and the specific surface areas were analyzed. The results are shown in Table 3. It should be noted that the number of samples was 20 for each capacitor, and Table 3 shows the mean values. The graphene interlayer distances were obtained by x-ray diffraction analysis (x-ray tube: Cu, voltage: 200 kV).

surface area, and the relationship between graphene interlayer distance versus capacity per unit electrode material weight.

Figure 2:
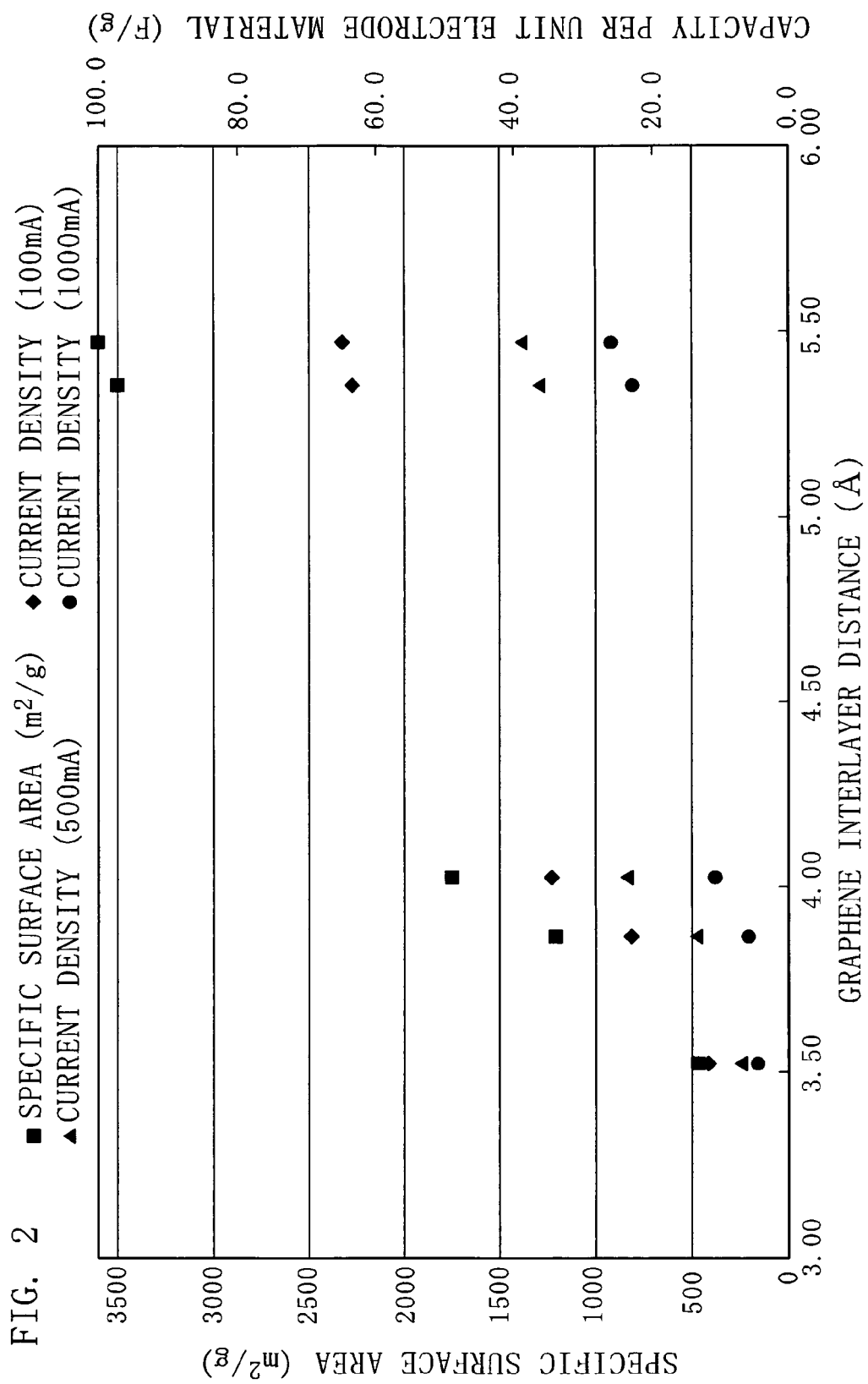
FIG. 2 is a graph illustrating the relationship between graphene interlayer distance versus specific surface area and capacity per unit electrode material weight.

As will be clearly seen from FIG. 2, as the graphene interlayer distance increases, the specific surface area and

TABLE 3

| Electric double layer capacitor | Carbon material | Activation method | Activation temperature in microwave activation (° C.) | Graphene interlayer distance (Å) | Specific surface area (m²/g) | Cap. (F/g) | | |
|---|---|---|---|---|---|---|---|---|
| | | | | | | Current density (100 mA) | Current density (500 mA) | Current density (1000 mA) |
| B2 | Carbon nanotube | Microwave activation | 500 | 3.86 | 1200 | 22.5 | 13.2 | 5.7 |
| B3 | Carbon nanotube | Microwave activation | 650 | 4.02 | 1750 | 34.0 | 23.2 | 10.5 |
| B1 | Carbon nanotube | Microwave activation | 800 | 5.35 | 3500 | 63.2 | 35.8 | 22.4 |
| B4 | Carbon nanotube | Microwave activation | 950 | 5.47 | 3900 | 64.8 | 38.3 | 25.6 |
| X1 | Activated carbon | Alkali activation | — | — | 3200 | 41.1 | 22.3 | 15.6 |
| Y | Carbon nanotube | Not activated | — | 3.52 | 462 | 11.5 | 6.7 | 4.5 |

As will be clearly appreciated from Table 3 above, in the case of using carbon nanotubes as the carbon material as well, the capacitors B1 to B4 of the invention, which utilized the carbon nanotubes activated by a microwave activation process, showed larger capacities per unit electrode material weight than the comparative capacitor Y, which used the carbon nanotube that was not subjected to a microwave activation process.

The reason is believed to be as follows.

Subjecting a carbon nanotube to a microwave activation process widens a portion of the lattice spacing in the network that constitutes the graphene sheet, thereby further forming micropores and macropores, and increases the surface area further; moreover, the diameter of the open-end tube-shaped graphene sheet also increases, and accordingly, the graphene interlayer distance increases in the multilayer structure carbon nanotube.

Moreover, because of the increase in the graphene interlayer distance and the formation of the micropores and macropores, the ion sieve effect originating from the interaction with the electrolyte ions in the electrolyte solution does not easily occur.

Furthermore, because the microwave activation process breaks a portion of the lattice spacing in the network that consititutes the graphene sheet, the surface area of the graphene sheet can be increased even in the single-layer structure carbon nanotube.

The capacitors B1 and B4 of the invention, which utilized carbon nanotubes as the carbon material and the temperature of the microwave activation process was 800° C. or higher, showed a larger capacity per unit electrode material weight than the comparative capacitor X1, which used, as the carbon material, activated carbon that was activated by an alkali activation process.

This is believed due to the fact that the graphene interlayer distance further increases in the carbon nanotube activated by a microwave activation process at a temperature of 800° C., and accordingly the specific surface area increases.

FIG. 2 shows a graphical representation of the relationship between graphene interlayer distance versus specific surface area, and the relationship between graphene interlayer distance versus capacity per unit electrode material weight.

the capacity per unit electrode material weight correspondingly increase. In particular, the specific surface area and the capacity per unit electrode material weight abruptly increase in the graphene interlayer distance range of 3.86 Å to 4.02 Å.

This is believed due to the following reasons. Subjecting a carbon nanotube to a microwave activation process at a high temperature results in further formation of micropores and macropores and increases the surface area further. At the same time, the diameter of the graphene sheet further increases, and the graphene interlayer distance increases further. Because of these reasons, the ion sieve effect does not easily occur. Furthermore, even with the single-layer structure carbon nanotube, the surface area of the grapheme sheet increases further.

Additional Embodiments (1) Although Example A according to the first preferred embodiment utilizes the fullerene activated by a microwave activation process for both the first polarizable electrode (positive electrode) and the second polarizable electrode (negative electrode), this configuration is not intended to be limiting, and it is of course possible to use the microwave-activated fullerene for only one of the polarizable electrodes. Moreover, the carbon material is not limited to that consisting only of the microwave-activated fullerene, and it is possible to use a mixture of activated carbon and the fullerene activated by a microwave activation process.

(2) The fullerene, utilized in Example A according to the first preferred embodiment, consists only of pure carbon, and has various structures formed of 5-membered rings and 6-membered rings of carbon. Accordingly, the fullerene is not limited to fullerene C60 and fullerene C70, which have spherically shaped molecules and have 60 and 70 carbon atoms per molecule, respectively.

(3) Although Examples B1 to B4 according to the second preferred embodiment utilize the carbon nanotube activated by a microwave activation process for both the first polarizable electrode (positive electrode) and the second polarizable electrode (negative electrode), this configuration is not intended to be limiting, and it is of course possible to use the microwave-activated carbon nanotube for only one of the polarizable electrodes. Moreover, the carbon material is not limited to that consisting only of the microwave-activated carbon nanotube, and it is possible to use a mixture of activated carbon and the carbon nanotube activated by a microwave activation process.

(4) Although carbon nanotubes, used in the foregoing second preferred embodiment (Examples B1 to B4), have various types such as single-layer carbon nanotubes and multilayer carbon nanotubes, they all yield the same advantageous effect because all of them have a network structure. Accordingly, the usable carbon nanotubes are not limited to a specific type.

(5) It is also possible to use a mixture of the fullerene activated by a microwave activation process and the carbon nanotube activated by a microwave activation process as the carbon material.

The present invention is applicable to, for example, memory backup power sources for mobile information terminals such as in mobile telephones, notebook computers, and PDAs, as well as for electric double layers uninterruptible power supplies and hybrid automobiles.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. An electric double layer capacitor comprising:
    an electrode unit having a pair of polarizable electrodes, each composed of a carbon material, and a separator interposed between the pair of polarizable electrodes; and an electrolyte solution impregnated in the pair of polarizable electrodes and the separator,
    the carbon material of at least one of the pair of polarizable electrodes containing fullerene activated by a microwave activation process.

2. The electric double layer capacitor according to claim 1, wherein the carbon material of at least one of the pair of polarizable electrodes consists of the fullerene activated by a microwave activation process.

3. The electric double layer capacitor according to claim 2, wherein the fullerene has spherically shaped molecules and the fullerene is a mixture of fullerene having 60 carbon atoms per molecule and fullerene having 70 carbon atoms per molecule.

4. The electric double layer capacitor according to claim 1, wherein the fullerene has spherically shaped molecules and the fullerene is a mixture of fullerene having 60 carbon atoms per molecule and fullerene having 70 carbon atoms per molecule.

5. A method of manufacturing an electric double layer capacitor, comprising:
    activating fullerene by a microwave activation process;
    preparing an electrode containing a carbon material and a binder, the carbon material composed of the fullerene activated by a microwave activation process;
    providing a pair of polarizable electrodes using the electrode that has been prepared in the step of preparing the electrode as at least one of the pair of polarizable electrodes;
    disposing a separator between the pair of polarizable electrodes; and
    impregnating an electrolyte solution into the pair of polarizable electrodes and the separator.

6. The method according to claim 5, wherein the fullerene has spherically shaped molecules and the fullerene is a mixture of fullerene having 60 carbon atoms per molecule and fullerene having 70 carbon atoms per molecule.

7. An electric double layer capacitor comprising:
    an electrode unit having a pair of polarizable electrodes, each composed of a carbon material, and a separator interposed between the pair of polarizable electrodes; and an electrolyte solution impregnated in the pair of polarizable electrodes and the separator,
    the carbon material of at least one of the pair of polarizable electrodes containing a carbon nanotube activated by a microwave activation process.

8. The electric double layer capacitor according to claim 7, wherein the carbon material of at least one of the pair of polarizable electrodes consists of the carbon nanotube activated by a microwave activation process.

9. The electric double layer capacitor according to claim 8, wherein the microwave-activated carbon nanotube has a graphene interlayer distance of 4.0 Å or greater.

10. The electric double layer capacitor according to claim 8, wherein the microwave-activated carbon nanotube has a graphene interlayer distance of 5.3 Å or greater.

11. The electric double layer capacitor according to claim 7, wherein the microwave-activated carbon nanotube has a graphene interlayer distance of 4.0 Å or greater.

12. The electric double layer capacitor according to claim 7, wherein the microwave-activated carbon nanotube has a graphene interlayer distance of 5.3 Å or greater.

13. A method of manufacturing an electric double layer capacitor, comprising:
    activating a carbon nanotube by a microwave activation process;
    preparing an electrode containing a carbon material and a binder, the carbon material composed of the carbon nanotube activated by the microwave activation process;
    providing a pair of polarizable electrodes using the electrode that has been prepared in the step of preparing the electrode as at least one of the pair of polarizable electrodes;
    disposing a separator between the pair of polarizable electrodes; and
    impregnating an electrolyte solution into the pair of polarizable electrodes and the separator.

14. The method according to claim 13, wherein, in the step of activating the carbon nanotube, the carbon nanotube is microwave-activated at a temperature of 650° C. or higher.

15. The method according to claim 13, wherein, in the step of activating the carbon nanotube, the carbon nanotube is microwave-activated at a temperature of 800° C. or higher.

16. An electric double layer capacitor comprising:
    an electrode unit having a pair of polarizable electrodes, each composed of a carbon material, and a separator interposed between the pair of polarizable electrodes;

and an electrolyte solution impregnated in the pair of polarizable electrodes and the separator, the carbon material of at least one of the pair of polarizable electrodes containing fullerene activated by a microwave activation process and a carbon nanotube activated by a microwave activation process.

17. A method of manufacturing an electric double layer capacitor, comprising:

activating fullerene by a microwave activation process and activating a carbon nanotube by a microwave activation process;

preparing an electrode containing a carbon material and a binder, the carbon material composed of the fullerene activated by the microwave activation process and the carbon nanotube activated by the microwave activation process; and providing a pair of polarizable electrodes using the electrode that has been prepared in the step of preparing the electrode as at least one of the pair of polarizable electrodes;

disposing a separator between the pair of polarizable electrodes; and impregnating an electrolyte solution into the pair of polarizable electrodes and the separator.

* * * * *